United States Patent
Maranville et al.

(10) Patent No.: US 9,885,526 B2
(45) Date of Patent: Feb. 6, 2018

(54) COOLING SYSTEM FOR VEHICLE SENSOR MODULES

(71) Applicant: Ford Global Technologies, LLC, Dearborn, MI (US)

(72) Inventors: Clay Wesley Maranville, Ypsilanti, MI (US); James George Gebbie, Rochester Hills, MI (US); Peter Rowling, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 41 days.

(21) Appl. No.: 15/067,595

(22) Filed: Mar. 11, 2016

(65) Prior Publication Data

US 2017/0261273 A1    Sep. 14, 2017

(51) Int. Cl.
| F28F 19/00 | (2006.01) |
| F28F 7/02 | (2006.01) |
| F25B 1/00 | (2006.01) |
| F25B 21/02 | (2006.01) |
| G01S 7/481 | (2006.01) |
| G01S 17/93 | (2006.01) |

(52) U.S. Cl.
CPC ............... F28F 7/02 (2013.01); F25B 1/00 (2013.01); F25B 21/02 (2013.01); G01S 7/4813 (2013.01); G01S 17/936 (2013.01); F25B 2321/023 (2013.01); F28F 2250/08 (2013.01)

(58) Field of Classification Search
CPC . F28F 7/02; F28F 2250/08; F25B 1/00; F25B 21/02; F25B 2321/023; G01S 7/4813; G01S 17/963; Y01S 903/907; H01M 10/5004

USPC .......................................................... 165/41
See application file for complete search history.

(56) References Cited

U.S. PATENT DOCUMENTS

| 4,419,716 A | 12/1983 | Koo |
| 6,493,920 B1 | 12/2002 | Hill et al. |
| 6,623,069 B2 | 9/2003 | Grimm |
| 7,021,704 B2 | 4/2006 | Martinez et al. |
| 7,616,443 B2 | 11/2009 | Walter |
| 7,789,176 B2 | 9/2010 | Zhou |
| 8,459,388 B2 | 6/2013 | Kim |

(Continued)

FOREIGN PATENT DOCUMENTS

| CN | 201803519 U | 4/2011 |
| DE | 102004029740 A1 | 2/2006 |

(Continued)

OTHER PUBLICATIONS

U.S. Appl. No. 15/016,699, filed Feb. 5, 2016, Maranville.

(Continued)

*Primary Examiner* — Davis Hwu
(74) *Attorney, Agent, or Firm* — Frank A. MacKenzie; Bejin Bieneman PLC (57) ABSTRACT

A cooling system for a vehicle sensor module includes an active internal gas circulation system and a cold plate. The sensor module includes a light detector sensor disposed in a sealed housing. The housing is at least partially transparent. A cold plate is disposed on an end of the housing, and seals the housing. The active internal gas circulation system is disposed within the housing, and defines a first fluid flow path across the cold plate.

16 Claims, 7 Drawing Sheets

(56) References Cited

U.S. PATENT DOCUMENTS

| | | |
|---|---|---|
| 8,820,395 B2 | 9/2014 | Yatskov |
| 2003/0159264 A1 | 8/2003 | McLeod et al. |
| 2004/0169771 A1* | 9/2004 | Washington ......... H04N 5/2251 348/374 |
| 2007/0025081 A1 | 2/2007 | Berlin et al. |
| 2010/0005822 A1 | 1/2010 | Bering et al. |
| 2011/0042058 A1* | 2/2011 | Kikuchi ............. B60H 1/00278 165/287 |
| 2013/0302653 A1* | 11/2013 | Pham ........................ H02J 7/00 429/50 |
| 2014/0079968 A1* | 3/2014 | Schmidt .............. B60L 11/1879 429/83 |
| 2015/0004459 A1 | 1/2015 | Yamamoto et al. |

FOREIGN PATENT DOCUMENTS

| | | |
|---|---|---|
| EP | 1302731 A1 | 4/2003 |
| EP | 2259012 A1 | 12/2010 |
| JP | 2009124074 A | 6/2009 |

OTHER PUBLICATIONS

U.S. Appl. No. 14/986,841, filed Jan. 4, 2016, Maranville et al.
Hessler, Jenny, "Multipanel roof systems," SAE International, Sep. 10, 2015.
https://media.ford.com/content/fordmedia/fna/us/news/2016/01/05/ford-tripling-autonomous-vehicle-developments-fleet-accelerating.html; Jan. 5, 2016, Las Vegas.
UK Search Report dated Sep. 7, 2017 re: GB1703913.2.

* cited by examiner

COOLING SYSTEM FOR VEHICLE SENSOR MODULES

BACKGROUND

Vehicles rely on sophisticated sensors to provide an associated computer or controller with location and situational awareness information such as the relative position of other vehicles, and the location of the autonomous vehicle relative to the traffic lanes. Certain externally located sensors are contained in one or more containers or housings on an exterior of the vehicle, with one exemplary location being a roof of the vehicle. Given such a location, the sensors are incorporated into a module including a hermetically sealed container or housing that receives and protects the sensors from fouling due to dust, humidity, and other contaminants. In such a location, the sensor modules are exposed to a wide range of extreme environmental conditions. In particular, an interior of the housing can become very hot, in excess of 100° C. Exemplary conditions that can lead to such in-housing temperatures include an ambient temperature of 43° C. in combination with a solar load of 1000 watts per square meter ($W/m^2$). Such sensors typically have a significantly lower preferred temperature operating range of approximately 20-25° C. However, with the sensors being in the sealed housing, direct convective air cooling of the sensor is not possible.

DETAILED DESCRIPTION

Introduction

Disclosed herein is a system for cooling a vehicle sensor module that is exposed to high ambient temperatures and significant solar energy loads. The cooling system for the vehicle sensor module includes an active internal gas circulation system and a cold plate. The sensor module includes a light detector sensor disposed in a sealed housing. The housing is at least partially transparent. A cold plate is disposed on an end of the housing, and seals the housing. The active internal gas circulation system is disposed within the housing, and defines a first fluid flow path across the cold plate.

Relative orientations and directions (by way of example, upper, lower, bottom, rearward, front, rear, back, outboard, inboard, inward, outward, lateral, left, right) are set forth in this description not as limitations, but for the convenience of the reader in picturing at least one embodiment of the structures described.

Exemplary System Elements

Figure 1:
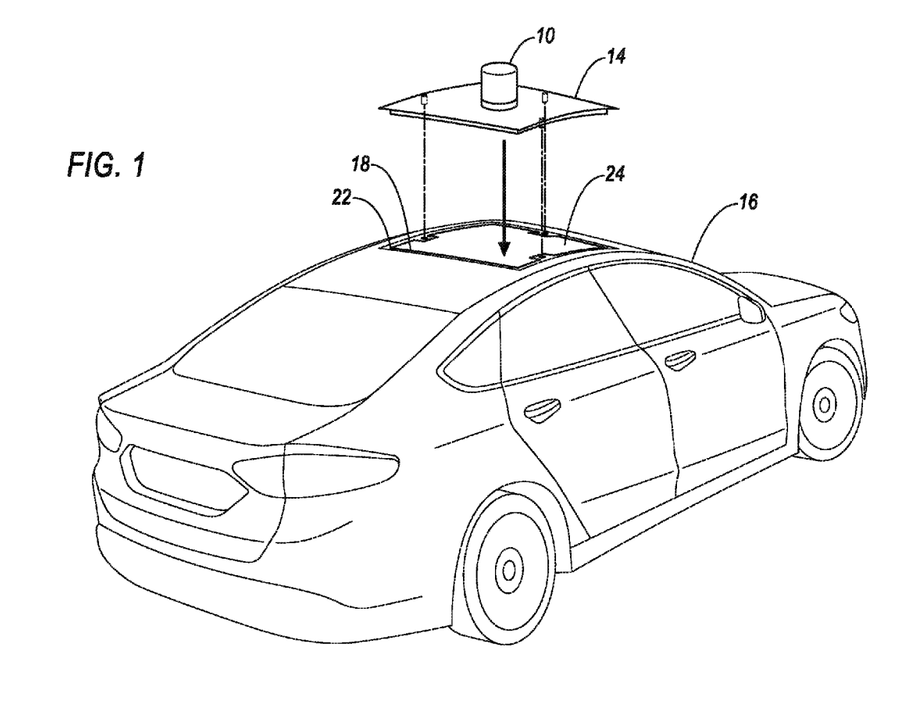
FIG. 1 is a perspective view of a vehicle incorporating an exemplary automated vehicle sensor module.
Figure 2:
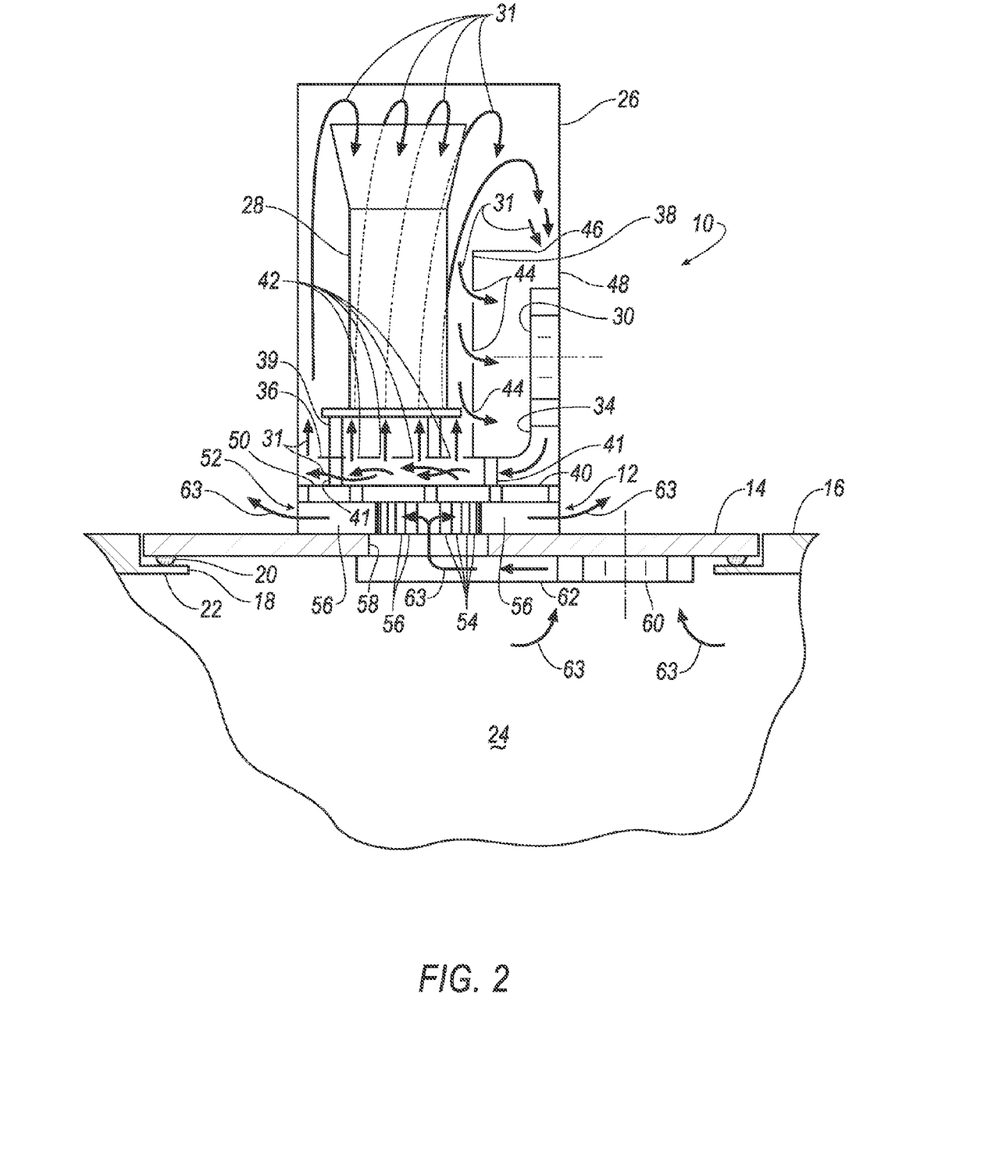
FIG. 2 is a schematic diagram of a sensor module incorporating an exemplary first embodiment of an outer cooling system.

FIG. 1 is a perspective drawing of a schematic diagram of a vehicle 16 including a sensor module 10 adapted for cooling with a cooling system 12 shown more completely in FIG. 2. Sensor module 10 is, in the exemplary illustration, fixed to a roof panel or mounting plate 14 for a vehicle 16. Mounting plate 14 fits within a roof opening 18 of vehicle 16. Plate 14 is complementary in shape to opening 18 and provides a substantially continuous, smooth flowing profile substantially identical to what the roof profile would be without the sensor. Plate 14 has a seal 20, shown in FIG. 2, that engages an exemplary opening surround to prevent the entry of water and air past plate 14 into a vehicle passenger cabin 24.

Now referring to FIG. 2, sensor module 10, and particularly a sensor housing 26, is hermetically sealed to prevent fouling due to dust, humidity, and other contaminants. Sensor module 10 includes, most prominently, the sensor housing 26 and a sensor 28 disposed inside housing 26. Sensor housing 26 is transparent to allow the operation of sensors disposed therein such as sensor 28. An exemplary representative sensor 28 includes a Lidar sensor which includes at least one laser projection element and calibrated light detection elements. The use of Lidar sensors in autonomous vehicles is known.

Sensor module 10 also includes an active internal gas circulation system 30. Module 10 is shown in more detail as an assembly in FIG. 10 and in an exploded view in FIG. 11. It can be air that is disposed inside of housing to serve as a heat transfer fluid. Further, while air is one suitable exemplary fluid, alternatives include nitrogen and other gases chosen for reasons potentially including high light transmissibility, low reactivity and heat transfer coefficients. Thus, while air is discussed herein as an exemplary fluid, it should be understood that other fluids such as nitrogen and/or other gases could be used, and could be referred to in the example. The exemplary fluid within housing 26 is in a gas state. The fluid in housing 26 is referred to generically as a gas.

Internal gas flow and an associated housing fluid flow path inside housing 26 is represented with arrows 31. The term fluid flow path as used herein means a flow pattern as may be established with the use of known engineering tools, including flow testing and computational fluid dynamics of a modeled design subject to specified operating conditions. The flow path is thus defined by the configuration of the internal air circulation system 30. Exemplary internal gas circulation system 30 includes an internal fan 32 and internal ducting 34. Exemplary fan 32 includes an electric drive motor. The gas circulation system 30 is referred to as an active internal gas circulation system because of the use of a fan 32 to circulate the gas. Internal ducting 34 includes a diffuser plate 36 near a bottom of module 10, and a return diffuser cover 38. Return diffuser cover 38 is fixed to a back or rear of housing 26 and sandwiches fan 32 between cover 38 and housing 26. A cold plate 40 is sealingly disposed proximate to a lower end or bottom of housing 26. Cold plate 40 is sealed, either directly or indirectly, to housing 26 such that fluid cannot be communicated in or out of housing 26, thereby protecting sensor 28. Sensor 28 is fixed within and is encapsulated by housing 26 in any appropriate manner. In the exemplary illustrations, sensor 28 is supported on diffuser plate 36 by a plurality of first support legs 39. Diffuser plate 36 is in turn supported on cold plate 40 by a plurality of second support legs 41. In one example, wires used to energize fan 32 and sensor 28 pass through plate 40 with a sealing interface therebetween. An exhaust side of fan 32 is aligned with a fan aperture 43 in plate 36 and sealed thereagainst by a compressible seal 45. Any of several mechanisms, as will be described in more detail below, can be used to cool cold plate 40.

Figure 10:
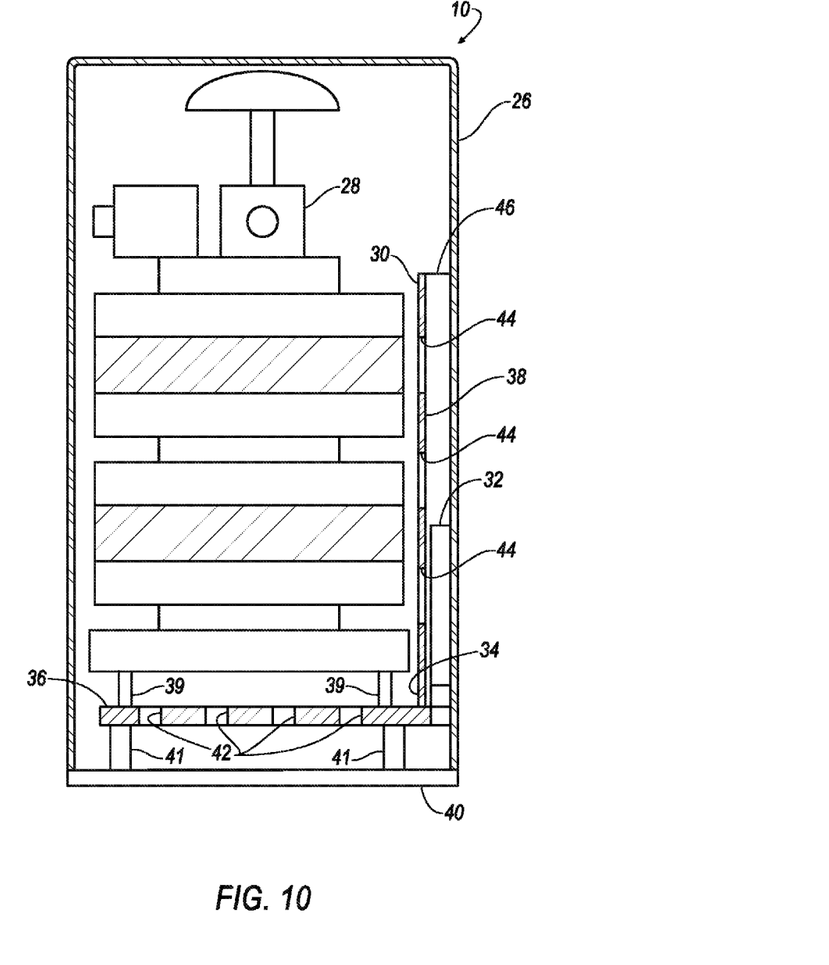
FIG. 10 is a sectional side view of an exemplary sensor module.
Figure 11:
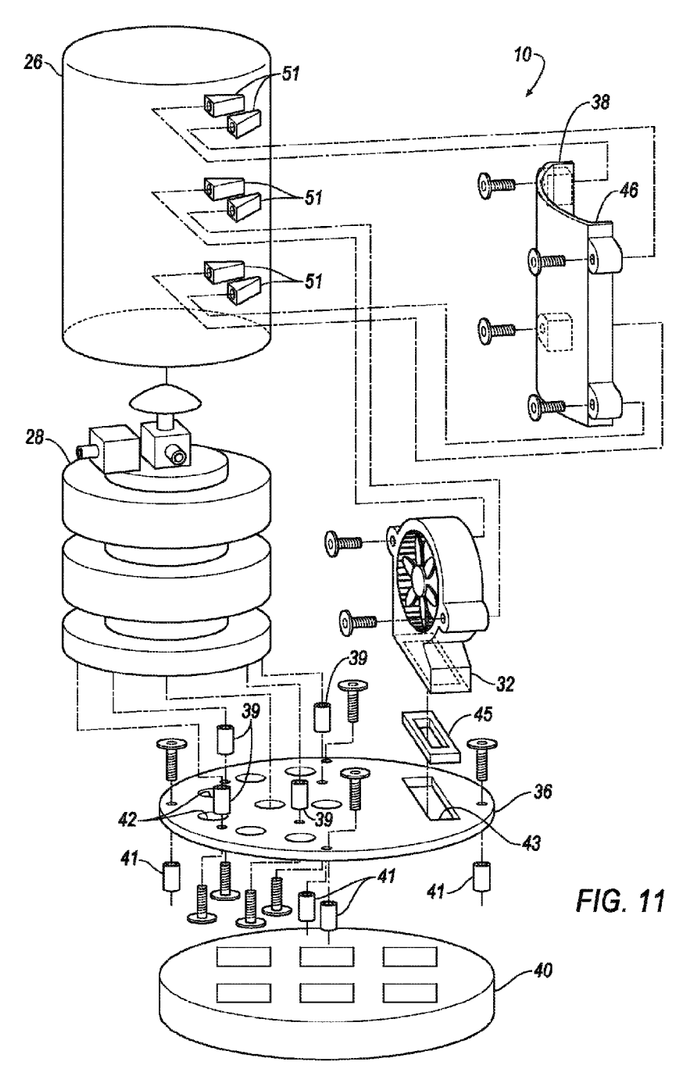
FIG. 11 is an exploded diagram of the exemplary sensor module of FIG. 10.

Diffuser plate 36 has formed therein a plurality of diffuser plate apertures 42 of one or more predetermined sizes, with the size of the apertures 42, the location of the apertures 42 and the quantity of the apertures 42 selected to maximally benefit a desired cooling of the housing interior. Similarly, return diffuser cover 38 has formed therein a plurality of return diffuser cover apertures 44 of one or more predetermined sizes, with the size of the apertures 44, the location of the apertures 44 and the quantity of the apertures 44 selected to maximally benefit a desired cooling of the housing's interior. Return diffuser cover 38 defines a primary return channel 46 between itself 38 and a wall 48 of housing 26. A turbulence region 50, coincident with a first part of housing fluid flow path 31 or first fluid flow path, is defined by a gap between diffuser plate 36 and cold plate 40. Exemplary mounting bosses 51 are formed integral with wall 48 and receive fasteners used to retain fan 32 and return diffuser cover 38 to wall 48. Although not illustrated, module 10 can be provided with an attachment feature based on attachment features used to restrain roof-mounted light beacons or flashers such as those employed by police departments. One such beacon is the RV-25 Spitfire model by Unity Manufacturing Company. Additional detail of exemplary module 10 is illustrated in FIG. 10 and FIG. 11. The above-described components are common to the examples of FIGS. 3, 5 and 8, except for the use of differing cold plates in those examples.

In the example of FIG. 2, cooling system 12 includes an exemplary external heat exchanger system 52. The exemplary heat exchanger system 52 includes a thermo-electric Peltier cooler alternatively defining or incorporated into cold plate 40. Peltier thermo-electric cooling devices are well known and commercially available from companies such as TECA Corporation and others. Exemplary heat exchanger system 52 further includes air ducting channels 54 defined by ducting fins or guides 56 disposed between cold plate 40 and mounting plate 14. Fins 56 are shown radiating out from an open center in a spoke-like fashion, but fins 56 could alternatively be arranged in parallel. A cabin exhaust aperture 58 passes through mounting plate 14, connecting the passenger cabin 24 with the ducting channels 54. An exemplary cabin fan 60 is disposed between passenger cabin 24 and aperture 58, and in an operating mode displaces air from passenger cabin 24 through aperture 58 and through the ducting channels 54 to an exterior of vehicle 16. Exemplary heat exchanger system 52 also has a cabin air channel 62 disposed between and connecting fan 60 with aperture 58. A flow of cabin air through a lower side of heat exchanger system 52 is illustrated with arrows 63. While it is possible to have fan 60 located at aperture 58, such a location may generate a level of noise objectionable to the vehicle passengers. The use of channel 62 allows the placement of fan 60 at a location remote from aperture 58 such that operation of fan 60 is not objectionable to passengers inside cabin 24. Channel 62 can be concealed by a headliner in the roof of the vehicle.

Figure 3:
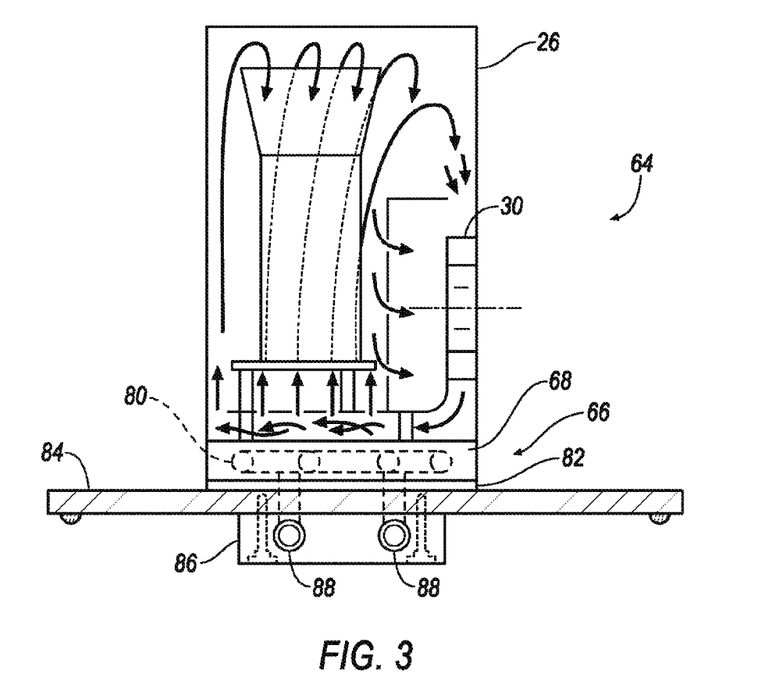
FIG. 3 is a schematic diagram of a sensor module incorporating an exemplary second embodiment of an outer cooling system.
Figure 4:
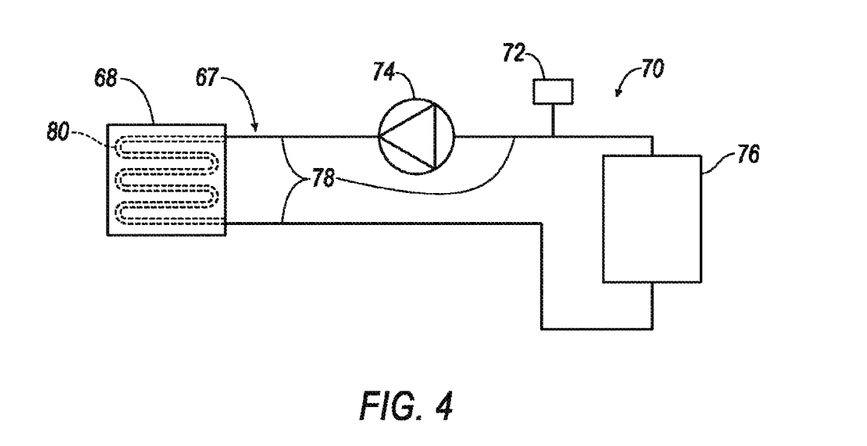
FIG. 4 is schematic diagram of an exemplary liquid coolant cooling circuit associated with the outer cooling system of FIG. 3.

In the example of FIGS. 3 and 4, an exemplary vehicle sensor module 64 incorporates an exemplary cooling system 66. Except for the differences in an external heat exchanger system 67 portion of the cooling system 66, module 64 is substantially identical to module 10. Cooling system 66 includes a cold plate 68 serving as a first heat exchanger. Exemplary cold plate 68 is configured as an air-to-liquid heat exchanger. Cooling system 66 further includes additional elements illustrated in the fluid circuit schematic 70 of FIG. 4. In addition to cold plate 68, the main elements of heat exchanger system 67 illustrated in schematic 70 include a pump 74 adapted to pumping liquids, a fill and degas fitting on an intake side of pump 74, a second heat exchanger 76, and fluid lines 78 or tubes fluidly connecting the other constituent elements of system 67 as illustrated in schematic 70. Second heat exchanger 76 can be a liquid to liquid heat exchanger, or alternatively a refrigerant to liquid heat exchanger or chiller, or an air to liquid heat exchanger.

FIG. 3 shows an integration of cooling system 66 with module 64 in greater detail. Cold plate 68 includes at least one cooling tube 80 enclosed therein or defined thereby and passing therethrough in a serpentine arrangement. Other arrangements of tube 80, including a single loop, are possible. An insulation and seal layer or plate 82 is disposed between cold plate 68 and a second exemplary embodiment of mounting plate 84. A transfer block 86 is fixed to a cabin side of mounting plate 84. Transfer block 86 covers apertures in plate 84 through which ends of cooling tube 80 communicate with passages in block 86. In the present example, transfer block 86 communicates fluid between cold plate 68 and the rest of cooling system 66. Exemplary fluid lines 78, in the form of tubes, connect to connectors 88 extending from block 86 and fluidly connected to cold plate 68.

Figure 5:
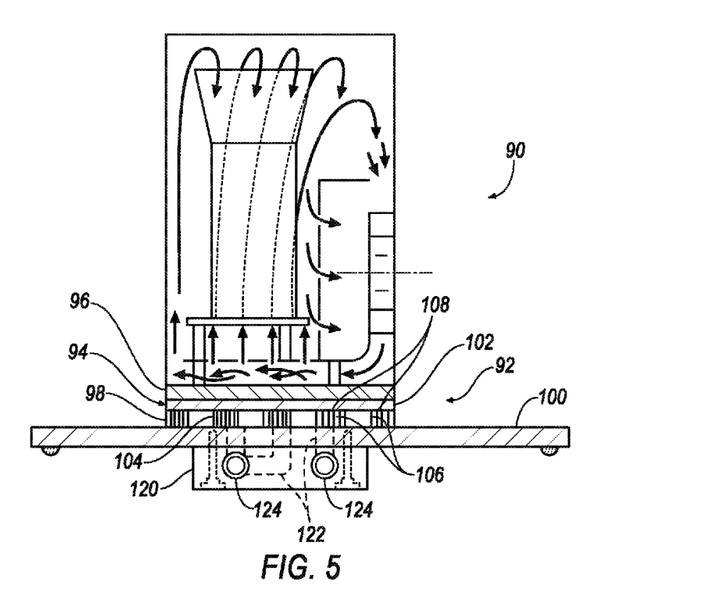
FIG. 5 is schematic diagram of a sensor module incorporating an exemplary third embodiment of an outer cooling system.
Figure 6:
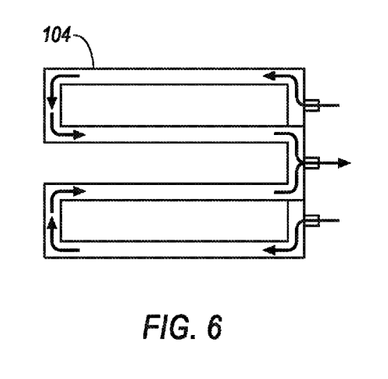
FIG. 6 is a schematic diagram of an exemplary evaporative channel tubing routing associated with the outer cooling system of FIG. 5.
Figure 7:
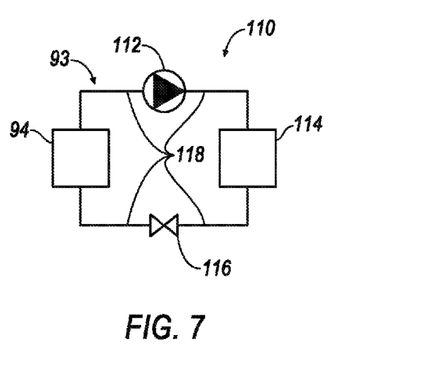
FIG. 7 is schematic diagram of an exemplary refrigerant-based coolant cooling system associated with the outer cooling system of FIG. 5.

In the example of FIGS. 5, 6, and 7, an exemplary vehicle sensor module 90 incorporates an exemplary cooling system 92. Except for the differences in the cooling system 92, module 90 is substantially identical to module 10. Cooling system 92 includes a multi-element heat exchanger 94. Heat exchanger 94 includes a thermally conductive cold plate 96 disposed at a bottom of module 90, an evaporator plate 98 disposed between the cold plate 96 and a third example of mounting plate 100, and a compliant, thermally conductive layer 102 disposed between the cold plate 96 and the evaporator plate 98. Evaporator plate 98 is thermally connected to layer 102 which in turn is thermally connected to cold plate 96, allowing a ready communication of thermal energy between evaporator plate 98 and a surface of cold plate 96 facing an interior of housing 26. Evaporator plate 98 comprises a parallel two-pass evaporative channel tubing 104, shown in more detail in FIG. 6, in combination with proximate air channels 106 defined by channel walls 108. An insulating layer (not shown) may be disposed between evaporator plate 98 and mounting plate 100.

Cooling system 92 further includes additional elements illustrated in a fluid circuit schematic 110 of FIG. 7. In addition to heat exchanger 94, the main elements of cooling system 92 illustrated in schematic 110 include a compressor 112, a condenser 114 and an expansion valve 116, and fluid lines 118 or tubes fluidly connecting the other constituent elements of system 92 as illustrated in schematic 110.

FIG. 5 illustrates one exemplary cooling system 92 of module 90. A transfer block 120 is fixed to a cabin side of mounting plate 100. Transfer block 120 covers apertures in plate 100 through which communicating passages 122, providing a fluid connection between tubing 104 and fluid lines 118, pass. In this example, transfer block 120 communicates fluid between cold plate 132 and the rest of cooling system 92. Exemplary fluid lines 118, in the form of tubes, connect to fittings 124 at block 120 and are fluidly connected to cold plate 96.

Figure 8:
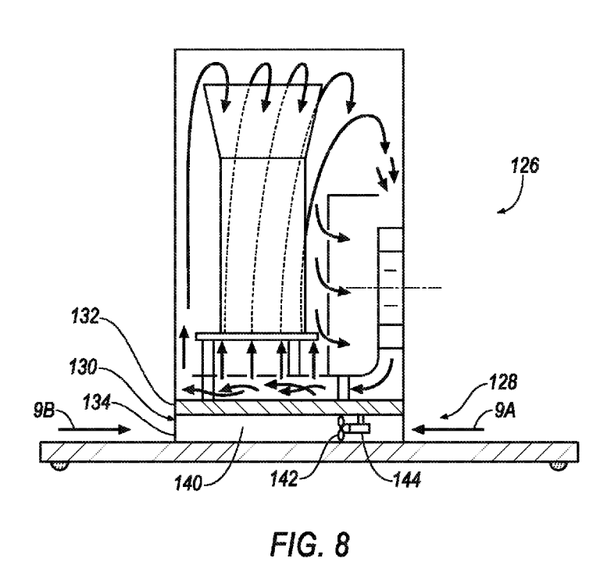
FIG. 8 is schematic diagram of a sensor module incorporating an exemplary fourth embodiment of an outer cooling system.
Figure 9A:
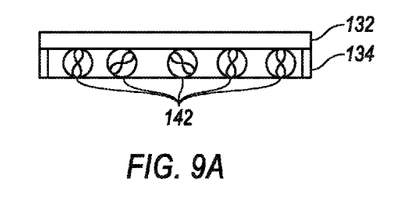
FIG. 9A is a side view of an exemplary cooler of the sensor module of FIG. 8 viewed in the direction of arrow 9A.
Figure 9B:
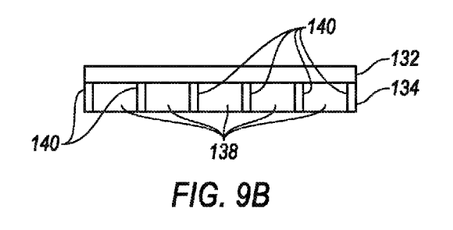
FIG. 9B is a side view of an exemplary cooler of the sensor module of FIG. 8 viewed in the direction of arrow 9B.

In the example of FIGS. 8, 9A and 9B, an exemplary vehicle sensor module 126 incorporates an exemplary cooling system 128. Except for the differences in the cooling system 128, module 126 is substantially identical to module 10. Cooling system 128 includes a multi-element heat exchanger 130. Heat exchanger 130 includes a cold plate 132 disposed at a bottom of module 126 and an air flow plate 134 disposed between the cold plate 132 and a fourth exemplary embodiment of mounting plate 136. Cold plate 132, like cold plate 40, includes a thermo-electric Peltier cooler that alternatively defines or is incorporated into cold plate 132. Air flow plate 134 includes a plurality of air channels 138 open to a direction of primary motion of the vehicle. Typically, open ends of channels 138 shown in FIG. 9B, in the direction of arrow 9B of FIG. 8, are forward facing, open towards a forward end of the vehicle, to receive on-coming air. Air channels 138 are defined by fins 140 that separate channels 138. In the exemplary air flow plate 134, a rear portion of each air channel 138 accommodates a small diameter, electrically driven fan 142. Fans 142 are shown in FIG. 9A in the direction of arrow 9A of FIG. 8. Each of the fans 142, when its electric motor 144 is energized, draws air through channels 138, and out through openings in a rear of plate 134. In an alternative embodiment, each of fans 142 could be associated with and draw air through a plurality of air channels 138 instead of a single air channel. Fans 142 are able to freely rotate when the electric motors are not energized.

Processing

The first example of the disclosed sensor module 10 with cooling features operates in the following manner. Fan 32 circulates air within housing 26, in a housing fluid flow path defined by the internal air circulation system 30. Exemplary housing fluid flow path is illustrated with arrows 31. Gas is drawn in by fan 32 through diffuser plate apertures 42 in return diffuser cover 38. The gas in housing 26 is directed by fan 32 into the turbulence region 50. The turbulence region, substantially coincident with the first fluid flow path of gas circulation system 30, has facing surfaces defined by cold plate 40 and diffuser plate 36 that induce turbulence and turbulent flow of gas from fan 32 and across the cold plate 40. Turbulent flow is more effective at transferring thermal energy and heat from the gas inside housing 26 to cold plate 40. The cooled gas passes out of the turbulence region 50 through apertures 42 further up into housing 26. It circulates around sensor 28. The sensor 28, with a temperature greater than the temperature of the gas, transfers thermal energy to the gas. Having circulated past sensor 28, the warmed gas is then drawn back in through apertures 44 and through channel 46. The size and location of apertures 44 and channel 46 are selected to facilitate circulation of the gas around and past sensor 28 to maximize the cooling of sensor 28.

Cold plate 40 relies on a thermo-electric transfer of heat energy from an interior of housing 26 to an exterior of housing 26 to keep the interior surface of cold plate 40 cool. It is then necessary to transfer heat away from the warm exterior surface of cold plate 40. Air from inside the vehicle passenger cabin 24 is forced by cabin fan 60 along cabin channeling 62, through aperture 58 and into contact with the exterior or warmer side of cold plate 40. The cooling cabin air is directed by fins 56 along a second fluid flow path defined by channeling 62 past cold plate 40. An exemplary second fluid flow path is illustrated with arrows 63. In one exemplary embodiment, heat is conducted from cold plate 40 into fins 56, providing an increased surface area for the transfer of heat.

The cooling system 66 of module 64, illustrated in FIGS. 3 and 4, operates in much the same manner as cooling system of module 10, but with heat exchanger system 67 in place of heat exchanger system 52. Heat exchanger system 67 is filled with liquid coolant via the fill/degas fitting 72. The cold plate 68 of the embodiment of FIGS. 3 and 4 relies on the circulation of a liquid coolant through the cooling tubes 80 incorporated into cold plate 68. The circulation of liquid coolant follows the fluid flow path defined by tubes 80, with tubes 80 providing the second fluid flow path. Coolant is pumped through heat exchanger system 67 by pump 74. Coolant is forced by the pressure from pump 74 through lines 78 to heat exchanger 76 where heat energy is removed from the coolant. The liquid coolant exits heat exchanger 76 and moves on to the cooling tubes 80 of cold plate 68, following the fluid flow path defined by tubes 80, with heat being transferred to the coolant as coolant travels through cold plate 68. The coolant then returns to pump 74, completing the cycle.

The cooling system 92 of module 90, illustrated in FIGS. 5, 6 and 7, operates in much the same manner as cooling system of module 10, but with a different external heat exchanger system 93 in place of heat exchanger system 52. The heat exchanger system 93 relies on the common refrigeration cycle for operation. The heat exchanger system 93 is filled with refrigerant via a pressure fitting (not shown). The cold plate 96 of the embodiment of FIGS. 5, 6 and 7 is cooled by evaporator plate 98 serving as a heat exchanger. The circulation of expanded refrigerant follows a fluid flow path, serving as the second fluid flow path, through the evaporative channel tubing 104 incorporated into the evaporator plate 98 cools evaporator plate 98. The refrigerant absorbs the heat transferred through the compliant layer 102 from cold plate 96. Warm, low pressure refrigerant leaving evaporator plate 98 reaches compressor 112 by way of fluid lines 118. Compressor 112 compresses the refrigerant which then enters the condenser 114. As the refrigerant passes through condenser 114, it condenses from vapor to liquid. The liquid refrigerant goes from the condenser to the expansion valve 116 where it is decreased in pressure, and ready to again enter the evaporator plate 98, repeating the cycle.

The cooling system 128 of module 126, illustrated in FIGS. 8, 9A and 9B, operates in much the same manner as cooling system of module 10, but with a different external heat exchanger system 130 in place of heat exchanger system 52. The heat exchanger system 130 relies on ambient outside air for cooling. Cold plate 132 is cooled by the circulation of air through channels 138 which define a fluid flow path thereacross. Channels 138 serve as the second fluid flow path. In the exemplary embodiment, fins 140 are formed of material that is a good conductor of heat, such as aluminum, in thermal communication with cold plate 132. The fins and a lower surface of cold plate 132 provide an increased amount of surface area for the transfer of heat from plate 132 to air passing therethrough. Fans 142 are activated when the vehicle is below a threshold speed to ensure a steady flow of cooling air past cold plate 132 and fins 140.

The above modules are exemplary illustrative examples and are not intended to be limiting. For example, the methods of mounting components such as sensor 28, fan 32, plate 36 and cover 38 can be varied from that described and illustrated. The listed components could be pre-assembled to each other, and inserted into housing 26 with fasteners passing through housing 26 retaining such a subassembly to housing 26, with such fasteners sealed. The fasteners could include plastic posts that are heated to deform retention caps on the outside of the housing 26. Further, the apertures 42, 44 could be located at alternate locations on plate 36 and cover 38, and be different in number and size relative to those illustrated. Fan 32 could be of the axial type or the centrifugal type, with an orientation of the fan depending on the fan type and the placement of apertures 42, 44. These listed alternatives are exemplary and not comprehensive.

CONCLUSION

A system for cooling a vehicle sensor module that is exposed to high ambient temperatures and significant solar energy loads has been disclosed.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In the drawings, the same reference numbers indicate the same elements. Further, some or all of these elements could be changed. With regard to the processes, systems, methods, etc. described herein, it should be understood that, although the steps of such processes, etc. (such as warming and cooling) have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A cooling system for a vehicle sensor module, comprising:
   an at least partially transparent and sealed housing;
   a light detector sensor disposed in the housing;
   a cold plate disposed on an end of the housing and sealing the housing and the sensor therein;
   a gas sealed in the housing; and
   an active internal gas circulation system disposed within the sealed housing defining a first fluid flow path of the gas across the plate,
   wherein the active internal gas circulation system includes an internal ducting comprising part of the active internal gas circulation system and defining a housing flow path for gas within the housing and the first fluid flow path comprising part of the housing flow path, and the internal ducting includes a return diffuser cover disposed against a side of the housing and a diffuser plate disposed over and spaced from the cold plate.

2. The system of claim 1, wherein a gap between the diffuser plate and the cold plate defines at least in part the first fluid flow path.

3. The system of claim 1, wherein the active internal gas circulation system includes a fan driven by an electric motor with both disposed within the housing.

4. The system of claim 1, wherein:
   the active internal gas circulation system includes a fan driven by an electric motor with both disposed within the housing;
   the internal ducting defines a housing flow path for gas within the housing and the first fluid flow path comprises part of the housing flow path; and
   the fan and the motor are both disposed between the return diffuser cover and the side of the housing.

5. The system of claim 1, wherein each of the return diffuser cover and the diffuser has a plurality of apertures, the apertures comprising part of the housing flow path.

6. The system of claim 1, wherein an external heat exchanger system is at least one of thermally connected to the cold plate and inclusive of the cold plate.

7. The system of claim 6, wherein a part of the external heat exchanger system is thermally connected to the cold plate.

8. The system of claim 7, wherein the external heat exchanger system includes a fluid guide defining the second fluid flow path.

9. A cooling system for a vehicle sensor module, comprising:
   a light detector sensor;
   a sealed housing encapsulating the sensor with the housing being at least partially transparent;
   a cold plate sealingly disposed on an end of the housing;
   a gas sealed in the housing;
   an active internal gas circulation system disposed within the housing defining a first fluid flow path of the gas across the cold plate; and
   an external heat exchanger system defining a second fluid flow path across at least one of the cold plate and a heat exchanger thermally connected to the cold plate,
   wherein the active internal gas circulation system includes an internal ducting comprising part of the active internal gas circulation system and defining a housing flow path for gas within the housing and the first fluid flow path comprising part of the housing flow path, and the internal ducting includes a return diffuser cover disposed against a side of the housing and a diffuser plate disposed over and spaced from the cold plate.

10. The system of claim 9, wherein a gap between the diffuser plate and the cold plate defines at least in part the first fluid flow path.

11. The system of claim 9, wherein the active internal gas circulation system includes a fan driven by an electric motor with both disposed within the housing.

12. The system of claim 10, wherein the active internal gas circulation system includes a fan driven by an electric motor with both disposed within the housing.

13. The system of claim 12, wherein the fan and motor are disposed between the return diffuser cover and the side of the housing.

14. The system of claim 12, wherein each of the return diffuser cover and the diffuser has a plurality of apertures, the apertures comprising part of the housing flow path.

15. The system of claim 9, wherein the external heat exchanger system is at least one of thermally connected to the cold plate and inclusive of the cold plate.

16. The system of claim 9, wherein the external heat exchanger includes a fluid guide defining the second fluid flow path.

* * * * *